(12) United States Patent
Dlugai et al.

(10) Patent No.: US 9,062,776 B2
(45) Date of Patent: Jun. 23, 2015

(54) SEALING DEVICE AND ROTARY BEARING THEREWITH

(75) Inventors: Darius Dlugai, Schweinfurt (DE);
Tilman Ulrich, Nuremberg (DE); Sven Hager, Wiesenthau (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 88 days.

(21) Appl. No.: 13/994,219

(22) PCT Filed: Dec. 6, 2011

(86) PCT No.: PCT/EP2011/071830
§ 371 (c)(1),
(2), (4) Date: Aug. 20, 2013

(87) PCT Pub. No.: WO2012/080027
PCT Pub. Date: Jun. 21, 2012

(65) Prior Publication Data
US 2013/0322791 A1    Dec. 5, 2013

(30) Foreign Application Priority Data

Dec. 14, 2010   (DE) .......................... 10 2010 054 409

(51) Int. Cl.
*F16C 33/76*   (2006.01)
*F16J 15/32*   (2006.01)
(Continued)

(52) U.S. Cl.
CPC ............ *F16J 15/3468* (2013.01); *F16J 15/164* (2013.01); *F16J 15/3208* (2013.01); *F16J 15/3264* (2013.01); *F16J 15/3448* (2013.01); *F16J 15/346* (2013.01); *F16C 33/72* (2013.01)

(58) Field of Classification Search
CPC ...... F16C 33/76; F16C 33/78; F16C 33/7816;
F16C 33/782; F16C 33/7823; F16C 33/784;
F16C 33/7843; F16C 33/7856; F16C 33/7869;
F16C 33/7873; F16C 33/7876; F16J 15/16;
F16J 15/32; F16J 15/3208; F16J 15/3224;
F16J 15/3296; F16J 15/34; F16J 15/3468;
F16J 15/3448; F16J 15/346; F16J 15/324;
F16J 15/3284; F16J 15/3244; F16J 15/3268;
F16J 15/3252; F16J 15/3212; F16J 15/328;
F16J 15/3236; F16J 15/164; F16J 15/3264
USPC ................. 384/488, 477, 484, 485, 486, 607;
277/549, 551, 553, 554, 556, 557
See application file for complete search history.

(56) References Cited

U.S. PATENT DOCUMENTS 4,350,351 A    9/1982  Martin
6,161,834 A  * 12/2000  Pollack et al. ................ 277/300
(Continued)

FOREIGN PATENT DOCUMENTS

DE         1960937      3/1967
DE       102005035027   2/2001
(Continued)

*Primary Examiner* — Alan B Waits
(74) *Attorney, Agent, or Firm* — Volpe and Koenig, P.C.

(57) ABSTRACT

The invention relates to a sealing device (1) for two components (4, 5) which are mounted on each other and are displaceable in relation to each other, in particular of a rotary bearing (2), with an elastomer part (7) which is arranged in a stationary manner on one of the components (4) and has at least one sealing surface (11, 12) providing a seal in relation to a mating sealing surface (9, 10) of the other component (5). In order to reduce the wear and frictional resistance of the sealing device (1), at least one sealing surface (11) is arranged so as to be controllable externally in respect of the press-on force thereof in relation to the mating sealing surface (9).

9 Claims, 2 Drawing Sheets

(51) Int. Cl.
*F16J 15/34* (2006.01)
*F16J 15/16* (2006.01)
*F16C 33/72* (2006.01)

(56) References Cited

U.S. PATENT DOCUMENTS

| | | | | |
|---|---|---|---|---|
| 7,458,727 | B2* | 12/2008 | Niebling et al. | 384/448 |
| 8,007,180 | B2* | 8/2011 | Niebling et al. | 384/448 |
| 8,439,571 | B2* | 5/2013 | Proeschel | 384/486 |
| 8,753,017 | B2* | 6/2014 | Shibata | 384/486 |
| 8,878,060 | B2* | 11/2014 | Wright et al. | 174/50.5 |
| 2003/0057655 | A1* | 3/2003 | Chehab et al. | 277/500 |
| 2005/0047691 | A1* | 3/2005 | Niebling et al. | 384/448 |
| 2005/0047693 | A1* | 3/2005 | Niebling et al. | 384/484 |
| 2006/0215947 | A1* | 9/2006 | Niebling et al. | 384/448 |
| 2009/0285516 | A1* | 11/2009 | Niebling et al. | 384/448 |
| 2010/0046873 | A1* | 2/2010 | Takimoto et al. | 384/478 |
| 2010/0148450 | A1* | 6/2010 | Schmied et al. | 277/558 |
| 2010/0322544 | A1* | 12/2010 | Hubbard et al. | 384/478 |
| 2011/0304120 | A1* | 12/2011 | Pasino | 280/276 |
| 2012/0134613 | A1* | 5/2012 | Schweitzer | 384/484 |
| 2012/0170884 | A1* | 7/2012 | Scott | 384/486 |
| 2013/0209010 | A1* | 8/2013 | Gruber et al. | 384/91 |
| 2013/0243359 | A1* | 9/2013 | Shibata | 384/486 |
| 2014/0010655 | A1* | 1/2014 | Hofmann | 416/174 |
| 2014/0177991 | A1* | 6/2014 | Toyoda et al. | 384/480 |

FOREIGN PATENT DOCUMENTS

| | | |
|---|---|---|
| DE | 102007028561 | 1/2009 |
| DE | 102008017306 | 10/2009 |

* cited by examiner ial unit, such as the rotary bearing, the axial guidance, and the like, so that power losses in the structural unit occur with increased energy consumption.

SEALING DEVICE AND ROTARY BEARING THEREWITH

BACKGROUND

The invention relates to a sealing device for two components that are mounted to each other and are displaceable relative to each other, in particular, in a rotary bearing with an elastomer part that is arranged stationary on one of the components with at least one sealing surface forming a seal with respect to a mating sealing surface of the other component.

Sealing devices according to the class are provided, for example, in rotary bearings such as anti-friction bearings, in order to protect a lubricant space from lubricant leaking out and contaminants entering into this space. For this purpose, the sealing device according to the class is mounted between a rotating component and a non-rotating component at their end sides. DE 10 2005 035 027 A1 shows one such sealing device in which an elastomer part forms a dynamic sealing contact by means of sealing surfaces, such as sealing lips, which are biased in the axial and radial directions against corresponding mating sealing surfaces. Due to the applied biasing force, wear occurs on the sealing lips and this wear must be designed for over the service life by the provision of oversize dimensions, so that an increased contact force is produced at least in the new state. The contact force, in turn, negatively affects the friction of the sealing device and thus of the structural unit, such as the rotary bearing, the axial guidance, and the like, so that power losses in the structural unit occur with increased energy consumption.

SUMMARY

The objective of the invention is therefore the refinement of a sealing device and a structural unit with this sealing device such that the wear of the sealing device and its power loss can be reduced.

The objective is met by a sealing device for two components that are mounted to each other and are displaceable relative to each other with an elastomer part that is arranged stationary on one of the components with at least one sealing surface forming a seal with respect to a mating sealing surface of the other component, wherein the sealing surface can be controlled externally with respect to its contact force relative to the mating sealing surface.

The components that are mounted to each other with the sealing device here form a structural unit in which the two components are sealed by means of the sealing device during an axial and/or rotating displacement relative to each other. Consequently, the structural unit can be provided as a linear guide unit, rotary bearing, and the like. A rotary bearing can be a sliding or anti-friction bearing, wherein the rotary bearing can be formed from a shaft/housing connection in which a shaft is arranged in the housing so that it can rotate by means of an anti-friction or sliding bearing and is optionally displaceable in the axial direction or can be formed from at least one inner ring and at least one outer ring on whose contact surfaces at least one set of roller bodies rolls or a corresponding sliding layer is provided. Such components for forming the structural unit hold the sealing device in that, on one of the components, preferably on a non-rotating or non-displaced component, the elastomer part with the sealing surface is supported, while the other preferably rotating or displaced component has the corresponding mating sealing surface for forming a dynamic sealing contact with the sealing surface.

Through the contact force that can be controlled externally and that acts on the mating sealing surface, an adjustable contact of the sealing surface of the elastomer part on the mating sealing surface can be achieved, for example, over the operating temperature or the like, wherein the wear and power losses can be optimized. For example, a contact-free position can be set that exerts a sealing effect only under a correspondingly applied contact force, as soon as this sealing effect is required.

In terms of the concept according to the invention, in one advantageous embodiment, the contact force is applied in that the elastomer part is supported against a support part and a hollow body that is filled with a heatable wax body and acts on the at least one sealing surface is provided radially inside of the support part. Due to the temperature-dependent volume loading of the wax body that can be turned into a fluid state, the sealing surface, such as a sealing lip, is pressed against the mating sealing surface with a controllable contact force externally through a corresponding selection of the heating power. The application of the contact force can be specified, for example, by means of a corresponding control unit in which the temperature is determined with reference to a corresponding formula, characteristic curves, or characteristic maps for a corresponding volume expansion of the wax body and a heating element is heated accordingly in the hollow space filled with the wax body. Here, the contact force can be oriented directly against the support force of the elastomer part on the support part or can be applied by means of a tractive force, in that, by displacing or tilting the elastomer part for a displacement of the elastomer part oriented against the support part, the sealing surface is brought into contact or held in contact with the mating sealing surface as a function of the contact force, such as a tractive force.

The production of the sealing device can be realized such that the hollow body is connected integrally to the elastomer part. Here, corresponding plastic processing methods, such as injection molding methods, can be applied, for example, as multi-component injection methods. Alternatively, the elastomer part can be profiled accordingly, so that the hollow body can be inserted in a multi-part construction of the sealing device. The elastomer part can further be supported by corresponding sheet-metal parts, wherein the elastomer part can be injection molded onto corresponding sheet-metal parts. The sheet-metal parts can be held in position on the component, for example, pressed or swaged.

According to one advantageous embodiment, for forming a sealing device for a rotary bearing, the elastomer part has a ring-shaped construction. The elastomer part can here form at least one radial and/or axial sealing surface, for example, in the form of a sealing lip. At least one of these sealing surfaces can be loaded by a hollow body filled with a heatable wax body and thus can be provided with a controllable contact force. For supporting the hollow body, a ring-shaped support part can be provided that is arranged on the outer periphery of the hollow body and can be arranged in a floating position or attached or supported on the elastomer part, on a sheet-metal part, such as a carrier part, connected to this elastomer part, or on the non-rotating contact surface of the rotary bearing. It can be further advantageous if the carrier part and the support part are formed integrally.

The objective is further solved by a rotary bearing with at least two components that are formed as inner and outer rings and can rotate relative to each other about a common axis and with a sealing device that is operatively arranged between these two components.

BRIEF DESCRIPTION OF THE DRAWINGS

The invention is explained in more detail with reference to the embodiments shown in FIGS. 1 to 3. Shown herein are.

DETAILED DESCRIPTION OF THE PREFERRED EMBODIMENTS

Figure 1:
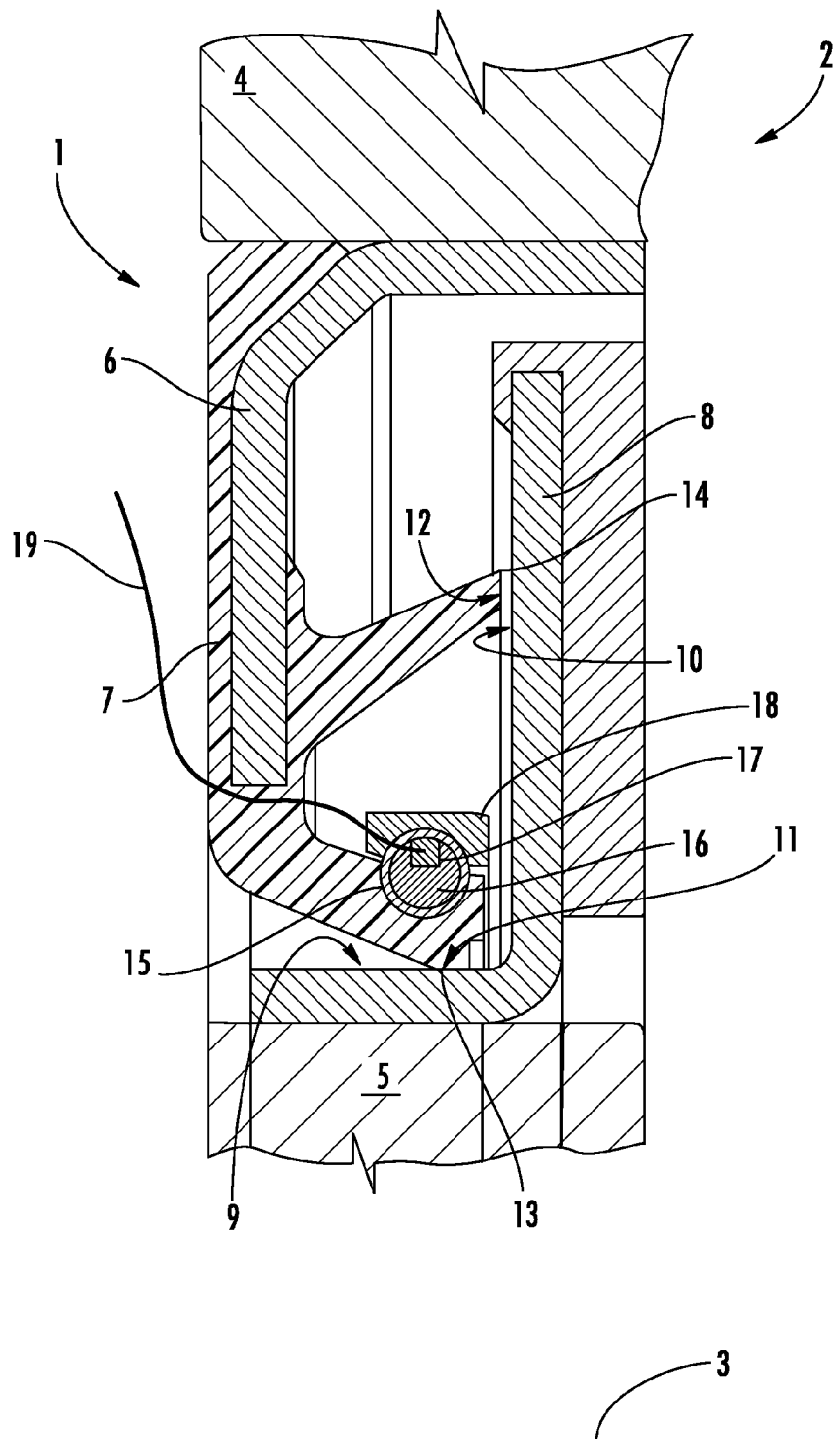
FIG. 1 a partial section through a sealing device with hollow body connected integrally to an elastomer part, FIG. 2 a partial section through a sealing device that is similar to the sealing device of FIG. 1 with separate elastomer part and hollow body, and FIG. 3 a partial section through a sealing device with sealing surface forming a seal in the axial direction.

FIG. 1 shows a partial section of a rotary bearing 2 arranged about a rotational axis 3 with the sealing device 1 arranged between the components 4, 5, such as an outer ring and inner ring, which can rotate relative to each other about the rotational axis 3. Each sealing device 1 can be arranged on both sides at the end sides of the rotary bearing 2, in order to bound a not-shown lubricant space enclosed by the components 4, 5 and the sealing devices 1. This device is bounded at least partially with lubricant for lubricating anti-friction bodies that are arranged between the components and rolling on the contact surfaces of these components and prevents a discharge of lubricant and soiling of this lubricant space due to the penetration of contaminants and moisture.

The elastomer part 7 is held on the stationary component 4 by means of the carrier part 6. On this elastomer part, the all-around sealing surfaces 11, 12 opposite the carrier part 8 with the mating sealing surfaces 9, 10 attached to the rotating component 5 are provided for forming a dynamic sealing contact and are formed, on one side, as a sealing lip 13 forming a radial seal and, on the other side, as a sealing lip 14 forming an axial seal.

For forming a contact force that can be controlled externally for the sealing surface 11 relative to the mating sealing surface 9, the hollow body 15 is connected integrally to the elastomer part 7. This hollow body has a torus-shaped construction and holds the wax body 16 that can be heated by means of the heating element 17 that is also held in the hollow body 15 via the feed line 19 of a not-shown control and power-supply device. The outer periphery of the hollow body 15 is supported by means of the ring-shaped support part 18 made, for example, from sheet metal or plastic.

If the wax body 16 is heated by the heating element 17, this wax body is turned to a fluid and increases its volume as a function of temperature—that is, as a function of the thermal energy applied by the heating element 17, wherein the elastic hollow body 15 is displaced on the support part 18 with a supporting function in the direction of the mating sealing surface 9, wherein the sealing surface 11 is pressed with a correspondingly increased contact force against the mating sealing surface 9. If the contact force is minimized due to a cooled wax body 16 or, in a friction-less construction of the sealing contact, a small clearance is set between the sealing surface 11 and the mating sealing surface 9, the contact force can be increased continuously with increasing heating of the wax body 16.

Figure 2:
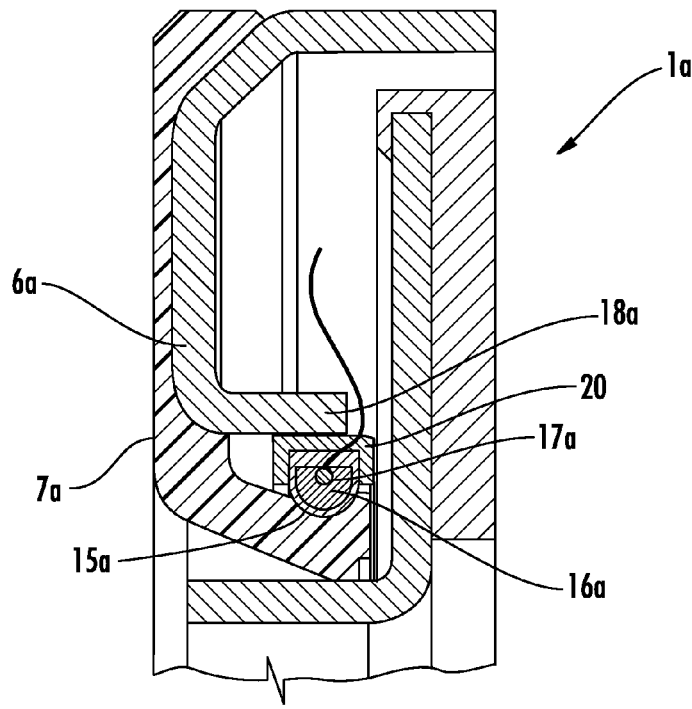

FIG. 2 shows the sealing device 1a in partial section that is changed relative to the sealing device 1 of FIG. 1 in the following ways: the hollow body 15a with the wax body 16a and the heating element 17a is separated from the elastomer part 7a, so that these can be mounted separately from each other in the sealing device 1a. The outer periphery of the hollow body 15a has a flat construction and is surrounded by the ring part 20 that is supported radially on the support part 18a. The support part 18a is integrated into the carrier part 6a of the elastomer part 7a. For this purpose, the carrier part 6a is moved axially onto its inner periphery.

Figure 3:
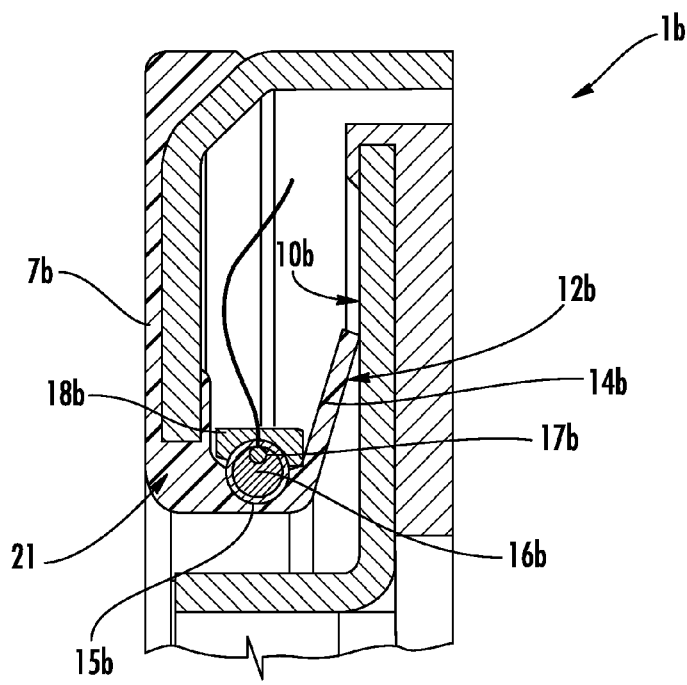

FIG. 3 shows the sealing device 1b in partial section. In this embodiment, a control of the contact force of the axially acting sealing surface 12b relative to the mating sealing surface 10b is provided. The arrangement of the hollow body 15b is realized according to the hollow body 15 of FIG. 1. The displacement of the hollow body 15b for a volume expansion due to heating of the wax body 16b by means of the heating element 17b is prevented accordingly by the ring-shaped support part 18b, so that, when heat is applied, the hollow body can expand radially inward. Consequently, the hollow body 15b presses onto the elastomer part 7b on whose inner periphery is arranged the sealing lip 14b that contains the sealing surface 12b and is pressed radially outward with axial bias against the mating sealing surface 10b. If the areas radially inside of the hollow body 15b of the elastomer part 7b are displaced radially inward by the hollow body 15b when the wax body 16b heats up, the sealing lip 14b rotates about a ring-shaped rotational area 21, so that the sealing lip 14b is pressed with higher contact force against the mating friction surface 10b.

| List of reference numbers | |
|---|---|
| 1 | Sealing device |
| 1a | Sealing device |
| 1b | Sealing device |
| 2 | Rotary bearing |
| 3 | Rotational axis |
| 4 | Component |
| 5 | Component |
| 6 | Carrier part |
| 6a | Carrier part |
| 7 | Elastomer part |
| 7a | Elastomer part |
| 7b | Elastomer part |
| 8 | Carrier part |
| 9 | Mating sealing surface |
| 10 | Mating sealing surface |
| 10b | Mating sealing surface |
| 11 | Sealing surface |
| 12 | Sealing surface |
| 12b | Sealing surface |
| 13 | Sealing lip |
| 14 | Sealing lip |
| 14b | Sealing lip |
| 15 | Hollow body |
| 15a | Hollow body |
| 15b | Hollow body |
| 16 | Wax body |
| 16a | Wax body |
| 16b | Wax body |
| 17 | Heating element |
| 17a | Heating element |
| 17b | Heating element |
| 18 | Support part |
| 18a | Support part |
| 18b | Support part |
| 19 | Feed line |
| 20 | Ring part |
| 21 | Rotational area |

The invention claimed is:

1. A sealing device for two components that are mounted to each other and are displaceable relative to each other, the sealing device comprising an elastomer part arranged stationary on one of the components with at least one sealing surface forming a seal with respect to a mating sealing surface of the other component, the elastomer part is supported against a support part and a hollow body that is filled with a heatable wax body, the hollow body is located radially inside of the support part and in contact with the elastomer part at a location opposite the at least one sealing surface, the at least one sealing surface is externally controllable with respect to a contact force relative to the mating sealing surface via a force exerted by the hollow body on the elastomer part.

2. The sealing device according to claim 1, wherein the wax body is heated by a heating element that is controlled externally according to a specified characteristic curve.

3. The sealing device according to claim 1, wherein the hollow body is connected integrally to the elastomer part.

4. The sealing device according to claim 1, wherein the elastomer part has a ring-shaped construction for sealing the components which form a rotary bearing.

5. The sealing device according to claim 1, wherein at least one of the sealing surfaces seals radially relative to the mating sealing surface.

6. The sealing device according to claim 1, wherein at least one of the sealing surfaces seals axially relative to the mating sealing surface.

7. The sealing device according to claim 1, wherein the support part is placed in a ring shape around an outer periphery of the hollow body.

8. The sealing device according to claim 1, wherein the support part is held integrally in a carrier part of the elastomer part.

9. A rotary bearing comprising at least two components formed as inner and outer rings that are rotatable relative to each other about a common axis and with a sealing device that is operatively arranged between said two components, the sealing device including an elastomer part that is arranged stationary on one of the components with at least one sealing surface forming a seal with respect to a mating, sealing surface of the other component, the elastomer part is supported against a hollow body that is filled with a heatable wax body, the hollow body arranged to apply a force on the elastomer part at a position opposite to the at least one sealing surface to increase a contact force of the at least one sealing surface against the mating sealing surface, with the at least one sealing surface externally controllable with respect to said contact force applied against said mating sealing surface.

\* \* \* \* \*